United States Patent
Stava et al.

(10) Patent No.: US 10,313,673 B2
(45) Date of Patent: Jun. 4, 2019

(54) METHODS AND APPARATUS TO ENCODE AND/OR DECODE NORMALS OF GEOMETRIC REPRESENTATIONS OF SURFACES

(71) Applicant: Google Inc., Mountain View, CA (US)

(72) Inventors: Ondrej Stava, San Jose, CA (US); Michael Hemmer, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 90 days.

(21) Appl. No.: 15/297,801

(22) Filed: Oct. 19, 2016

(65) Prior Publication Data

US 2018/0109795 A1    Apr. 19, 2018

(51) Int. Cl.
  H04N 7/12       (2006.01)
  H04N 19/136   (2014.01)
  H04N 19/167   (2014.01)
  H04N 19/17     (2014.01)
  H04N 19/423   (2014.01)
  G06T 7/70       (2017.01)
  G06T 7/11       (2017.01)
  (Continued)

(52) U.S. Cl.
  CPC .............. *H04N 19/136* (2014.11); *G06T 7/11* (2017.01); *G06T 7/13* (2017.01); *G06T 7/70* (2017.01); *H04N 19/167* (2014.11); *H04N 19/17* (2014.11); *H04N 19/423* (2014.11); *G06T 11/60* (2013.01)

(58) Field of Classification Search
  CPC ........................... H04N 19/136; G06T 7/0081
  USPC ...................................................... 375/240.14
  See application file for complete search history.

(56) References Cited

U.S. PATENT DOCUMENTS 6,088,035 A     7/2000  Sudarsky et al.
6,167,159 A   12/2000  Touma et al.
(Continued)

FOREIGN PATENT DOCUMENTS

CN   102467753 B   10/2013
CN   102682103 B     3/2014
(Continued)

OTHER PUBLICATIONS

International Search Report and Written Opinion for International Application No. PCT/US2017/057193, dated Feb. 2, 2018, 14 pages.
(Continued)

*Primary Examiner* — Richard T Torrente
(74) *Attorney, Agent, or Firm* — Brake Hughes Bellermann LLP

(57) ABSTRACT

Methods and apparatus to encode and decode normals of geometric representations of surfaces are disclosed herein. An example method includes defining a tile having regions, each of the regions of the tile corresponding with a surface of a geometric shape, arranging an edge of a first instance of the tile to abut an edge of a second instance of the tile to define a composite tile, determining a first vector between a first point on the composite tile in the first instance of the tile, and a second point on the composite tile in the second instance of the tile, and encoding the first vector to determine an approximation of the location of the second point relative to the first point.

19 Claims, 11 Drawing Sheets

(51) Int. Cl.
*G06T 7/13* (2017.01)
*G06T 11/60* (2006.01)

(56) References Cited

U.S. PATENT DOCUMENTS

| | | | |
|---|---|---|---|
| 6,204,854 B1* | 3/2001 | Signes | G06T 3/60 345/427 |
| 6,262,737 B1 | 7/2001 | Li et al. | |
| 6,525,722 B1 | 2/2003 | Deering et al. | |
| 6,532,012 B2 | 3/2003 | Deering et al. | |
| 6,563,500 B1 | 5/2003 | Deering et al. | |
| 6,879,324 B1 | 4/2005 | Hoppe et al. | |
| 7,103,211 B1 | 9/2006 | Medioni et al. | |
| 7,280,109 B2 | 10/2007 | Hoppe et al. | |
| 7,283,134 B2 | 10/2007 | Hoppe et al. | |
| 7,804,498 B1 | 9/2010 | Graham et al. | |
| 8,022,951 B2 | 9/2011 | Zhirkov et al. | |
| 8,217,941 B2 | 7/2012 | Park et al. | |
| 8,390,622 B2 | 3/2013 | Park et al. | |
| 8,619,085 B2 | 12/2013 | Keall et al. | |
| 8,660,376 B2 | 2/2014 | Ahn et al. | |
| 8,736,603 B2 | 5/2014 | Curington et al. | |
| 8,805,097 B2 | 8/2014 | Lee et al. | |
| 8,811,758 B2 | 8/2014 | Leed et al. | |
| 8,884,953 B2 | 11/2014 | Teng et al. | |
| 8,949,092 B2 | 2/2015 | Chen et al. | |
| 9,064,311 B2 | 6/2015 | Mammou et al. | |
| 9,111,333 B2 | 8/2015 | Jiang | |
| 9,171,383 B2 | 10/2015 | Lee et al. | |
| 9,348,860 B2 | 5/2016 | Cai et al. | |
| 9,396,512 B2 | 7/2016 | Karras | |
| 9,424,663 B2 | 8/2016 | Ahn et al. | |
| 2004/0208382 A1 | 10/2004 | Gioia et al. | |
| 2011/0010400 A1 | 1/2011 | Hayes et al. | |
| 2012/0306875 A1 | 12/2012 | Cai | |
| 2014/0168360 A1 | 6/2014 | Ahn et al. | |
| 2014/0303944 A1 | 10/2014 | Jiang et al. | |
| 2016/0086353 A1 | 3/2016 | Zalik et al. | |

FOREIGN PATENT DOCUMENTS

| | | |
|---|---|---|
| KR | 1019990085657 A | 12/1999 |
| KR | 1020010008944 A | 2/2001 |
| KR | 1020030071019 A | 9/2003 |
| KR | 100420006 B1 | 2/2004 |
| KR | 1020040096209 A | 11/2004 |
| KR | 1020050006322 A | 1/2005 |
| KR | 1020050006323 A | 1/2005 |
| KR | 1020060087631 A | 8/2006 |
| KR | 1020060087647 A | 8/2006 |
| KR | 1020060087662 A | 8/2006 |
| KR | 1020060088136 A | 8/2006 |
| KR | 1020080066216 A | 7/2008 |
| KR | 1020090025672 A | 3/2009 |
| KR | 1020090097057 A | 9/2009 |
| KR | 100927601 B1 | 11/2009 |
| KR | 1020100007685 A | 1/2010 |
| KR | 20100012724 A | 2/2010 |
| KR | 20100112848 A | 10/2010 |
| WO | 0045237 A2 | 8/2000 |
| WO | 2010111097 A1 | 9/2010 |

OTHER PUBLICATIONS

Meyer, et al., "On Floating-Point Normal Vectors"; Computer Graphics Forum, vol. 29, No. 4, Jun. 1, 2010, 6 pages.
Munkberg, et al., "High Quality Normal Map Compression"; Proceedings of the 21st ACM Siggraph/Erographics Symposium on Graphics Hardware, Sep. 4, 2006, 8 pages.
Alliez, et al., "Progressive compression for lossless transmission of triangle meshes", Proceedings of the 28th annual conference on Computer graphics and interactive techniques, 2001, 8 pages.
Schnabel, "Octree-based Point-Cloud Compression", Eurographics Symposium on Point-Based Graphics, 2006, 11 pages.
"Entropy encoding", Wikipedia, the free encyclopedia, retrieved from https://en.wikipedia.org/wiki/Entropy_encoding, Apr. 11, 2016, 1 page.
"Quantization", Wikipedia, the free encyclopedia, retrieved from https://en.wikipedia.org/wiki/Quantization, Apr. 11, 2016, 1 page.
Gandoin, et al., "Progressive lossless compression of arbitrary simplicial complexes", ACM Transactions on Graphics (TOG), Jul. 23, 2002, pp. 372-379.
Gumhold, et al., "Predictive point-cloud compression", ACM SIGGRAPH 2005 Sketches, Jul. 31, 2005, 1 page.
Huang, et al., "Octree-Based Progressive Geometry Coding of Point Clouds", SPBG Jul. 29, 2006: 103110, Jul. 29, 2006, pp. 103-110.
Merry, et al., "Compression of dense and regular point clouds", Computer Graphics Forum, Dec. 1, 2006, pp. 709-716.
Waschbüsch, et al., "Progressive compression of point-sampled models", Eurographics symposium on point-based graphics, Jun. 2, 2004, pp. 95-102.
"A Rational Parameterization of the Unit Circle", Leaves of Math, retrieved on Aug. 26, 2016 from https://mathnow.wordpress.com/2009/11/06/a-rational-Parameterization-of-the-Unit-Circle/, Nov. 6, 2009, 4 pages.
Isenburg, "Compression and Streaming of Polygon Meshes", dissertation, retrieved on Jul. 14, 2016 from http://cs.unc.edu/newspublications/doctoral-dissertations/abstracts-a-l/#lsenburg, 2005, 217 pages.
Narkowicz, "Octahedron normal vector encoding", retrieved on Aug. 26, 2016 from https://knarkowicz.wordpress.com/2014/04/16/octahedron-normal-vector-encoding/, Apr. 16, 2014, 9 pages.

* cited by examiner

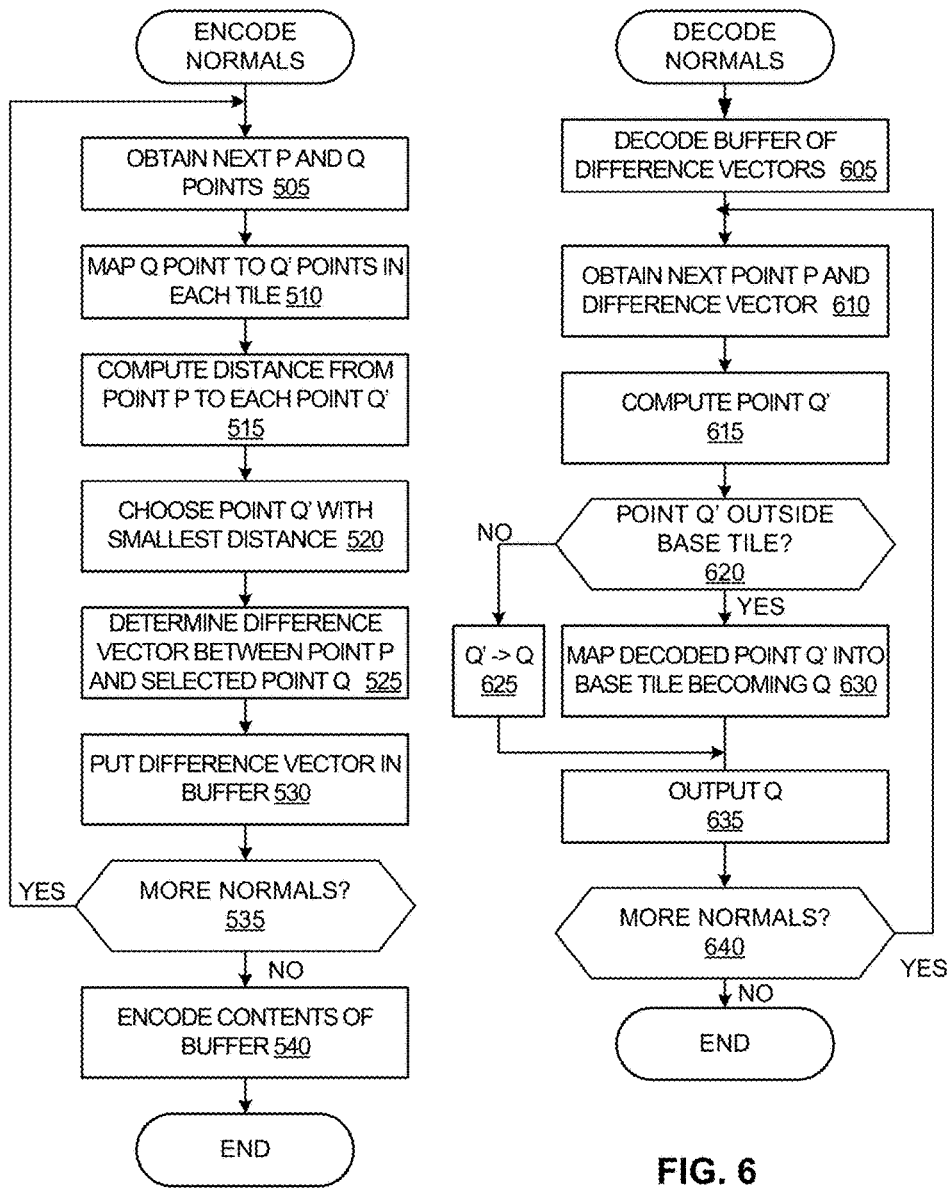

|  | naive | Composite Tile | | Tile Assembly | |
| --- | --- | --- | --- | --- | --- |
|  | bytes | bytes | reduction | bytes | reduction |
| Bunny | 35966 | 34523 | 4.01% | 34677 | 3.58% |
| Buddha | 708903 | 681373 | 3.88% | 682386 | 3.74% |
| Boston XL | 5246916 | 5001216 | 4.68% | 4980349 | 5.08% |

FIG. 11

METHODS AND APPARATUS TO ENCODE AND/OR DECODE NORMALS OF GEOMETRIC REPRESENTATIONS OF SURFACES

FIELD OF THE DISCLOSURE

This disclosure relates generally to geometric representations of surfaces, and, more particularly, to methods and apparatus to encode and/or decode normals of geometric representations of surfaces.

BACKGROUND

The surface of a real or computer-generated object can be represented by geometric shapes, such as triangles, that form a piecewise planar approximation of the surface. The geometric shapes collectively form a geometric representation of the surface. Triangles can be defined by three vertices, and a normal, which is a vector that is normal to the plane formed by the triangle. In some examples, a normal can be at a vertex. In some instances, interpolation is used to determine normals that vary gradually across a surface.

SUMMARY

Methods and apparatus to encode and/or decode normals of geometric representations of surfaces are disclosed herein. An example method includes defining a tile having a plurality of regions, each of the plurality of regions of the tile corresponding with a surface from a plurality of surfaces of a geometric shape, arranging an edge of a first instance of the tile to abut an edge of a second instance of the tile to define a composite tile, determining a first vector between a first point on the composite tile in the first instance of the tile, and a second point on the composite tile in the second instance of the tile, and encoding the first vector to determine an approximation of the location of the second point relative to the first point.

BRIEF DESCRIPTION OF THE DRAWINGS

FIG. 5 is a flowchart representing an example method that may be used to encode a normal using the example composite tile of FIGS. 2A-2B.

FIG. 6 is a flowchart representing an example method that may be used to decode an encoded normal using the example composite tile of FIGS. 2A-2B.

FIG. 11 is a table showing example compression gains that may be achieved using the example methods disclosed herein.

DETAILED DESCRIPTION

Figure 1:
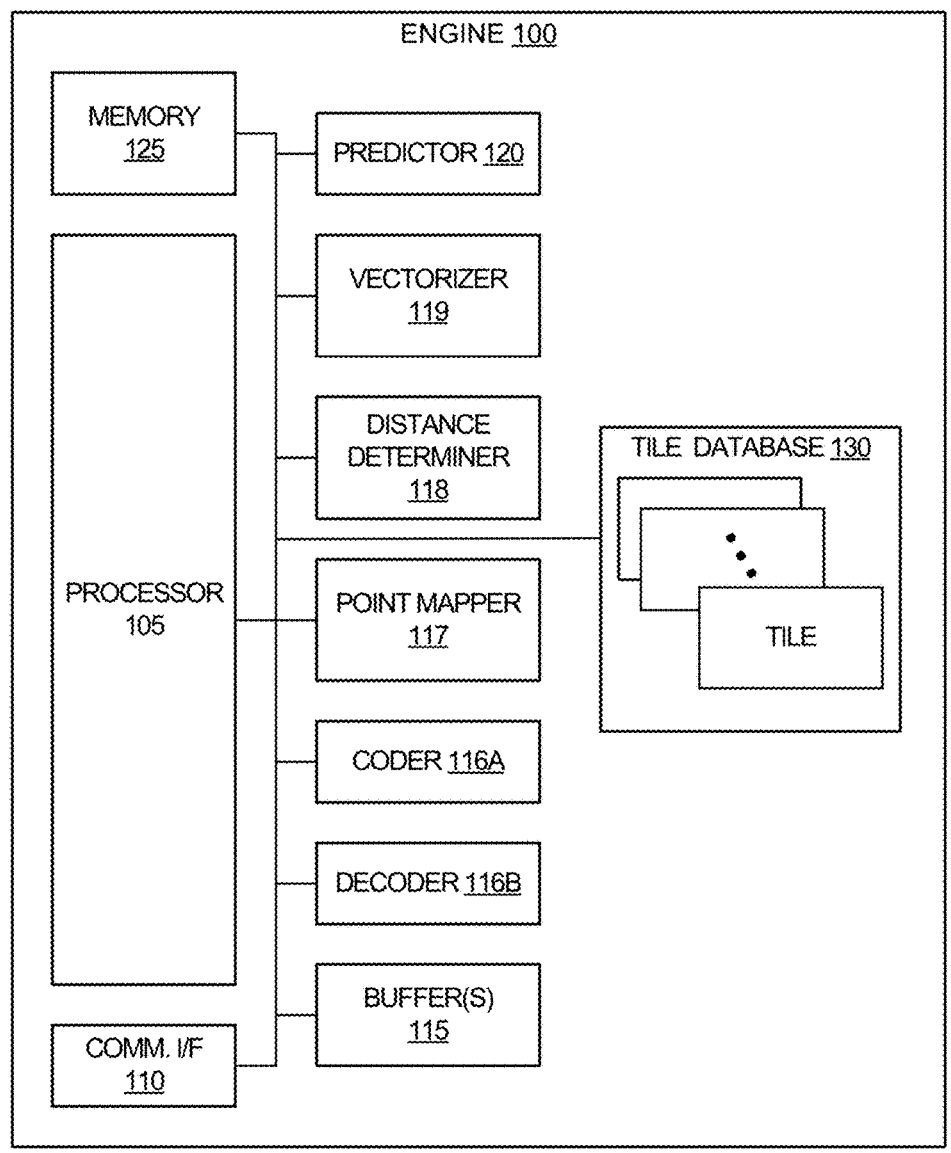
FIG. 1 is a schematic diagram that illustrates an example engine in accordance with the teachings of this disclosure.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

A geometric shape (e.g., an octahedron) may be used to represent normals of a surface. The geometric shape can be transformed into an at least partially flattened form for ease of computation. Consider an octahedron; it can be flattened with low distortion into a square by cutting one tip and the four edges adjoining the tip. The flattened shape will have four inner triangles (or areas, portions, regions, etc.) S1-S4 corresponding to the four surfaces the uncut half of the octahedron, and four outer triangles SA-SD corresponding to the four surfaces of the cut half of the octahedron (e.g., see FIG. 7A). A downside of this approach is that some points on adjacent surfaces (e.g. SA and SB) of the original octahedron become further apart after the octahedron is flattened, because their shared boundary has been cut. This increase in distance unfairly penalizes points that occur in the cut portion of the octahedron. Such penalties reduce the amount of entropy encoding that can be realized using the flattened geometric shape.

Example composite tiles and tile assemblies are disclosed that reverse this location dependent unfairness in the distance between points. The examples disclosed herein can ensure that the distance between a pair of points does not depend on where the points are located. For example, are they on the cut or uncut portion of the octahedron? By maintaining the correct distances between points, increases can be gained in the entropy encoding beyond that realizable using the flattened octahedron. Such gains come alongside the computational and ease of implementation gains arising from use of a flattened form.

FIG. 1 is a schematic diagram of an example engine 100 having a processor 105, a network interface 110, and a plurality of components 115-119. The engine 100 can include a coder 116A and/or a decoder 116B. When the engine 100 includes the coder 116A, the engine 100 can encode normals of geometric representations of surfaces. When the engine 100 additionally or alternatively includes the decoder 116B, the engine 100 can decode encoded normals of geometric representations of surfaces. Some or all of the components 115-119, together or in combinations, may be implemented by machine-readable instructions executed by the processor 105.

The example processor 105 of FIG. 1 can be in the form of a microcontroller, a central processing unit (CPU), an ASIC, a digital signal processor (DSP), an FPGA, a graphics processing unit (GPU), etc. programmed or configured to execute machine-readable instructions stored in memory 125. The instructions, when executed, cause the processor 105 and/or the components 115-119 to, among other things, control the engine 110 to encode and/or decode normals of geometric representations of surfaces. In some examples, more than one processor 105 and/or more than one memory 125 can be included in the engine 110. The engine 100 may be communicatively coupled to other devices (not shown) (e.g., to exchange data representing normals and encoded normals) via, for example, a communication interface (I/F) 120 that implements communication signals and/or protocols, such as Bluetooth®, Wi-Fi®, universal serial bus (USB), etc.

To store incoming and outgoing data, the example engine 100 of FIG. 1 includes any number and/or type(s) of buffers 115. When used to compress data, the example engine 100 of FIG. 1 includes any number and/or type(s) of coder 116A that performs, for example, Huffman, arithmetic, etc. entropy coding. When used to decompress data, the example engine 100 of FIG. 1 includes any number and/or type(s) of decoder 116B that performs, for example, Huffman, arithmetic, etc. entropy decoding. When the engine 100 is used to compress and decompress data, both the coder 116A and decoder 116B are included in the engine 100.

To map data points to one or more tiles, such as those described below in connection with FIGS. 2A, 7A and 7B, the example engine 100 includes a point mapper 117. To determine distances between at least points on one or more tiles, the example engine 100 includes a distance determiner 118. To determine one or more vectors between points on one or more tiles, the example engine 100 includes a vectorizer 119.

The example engine 100 of FIG. 1 will now be described in further detail with reference to FIGS. 2A-B, 3, 4, 5, 6, 7A-C, 8A-C, 9 and 10.

Figure 2A:
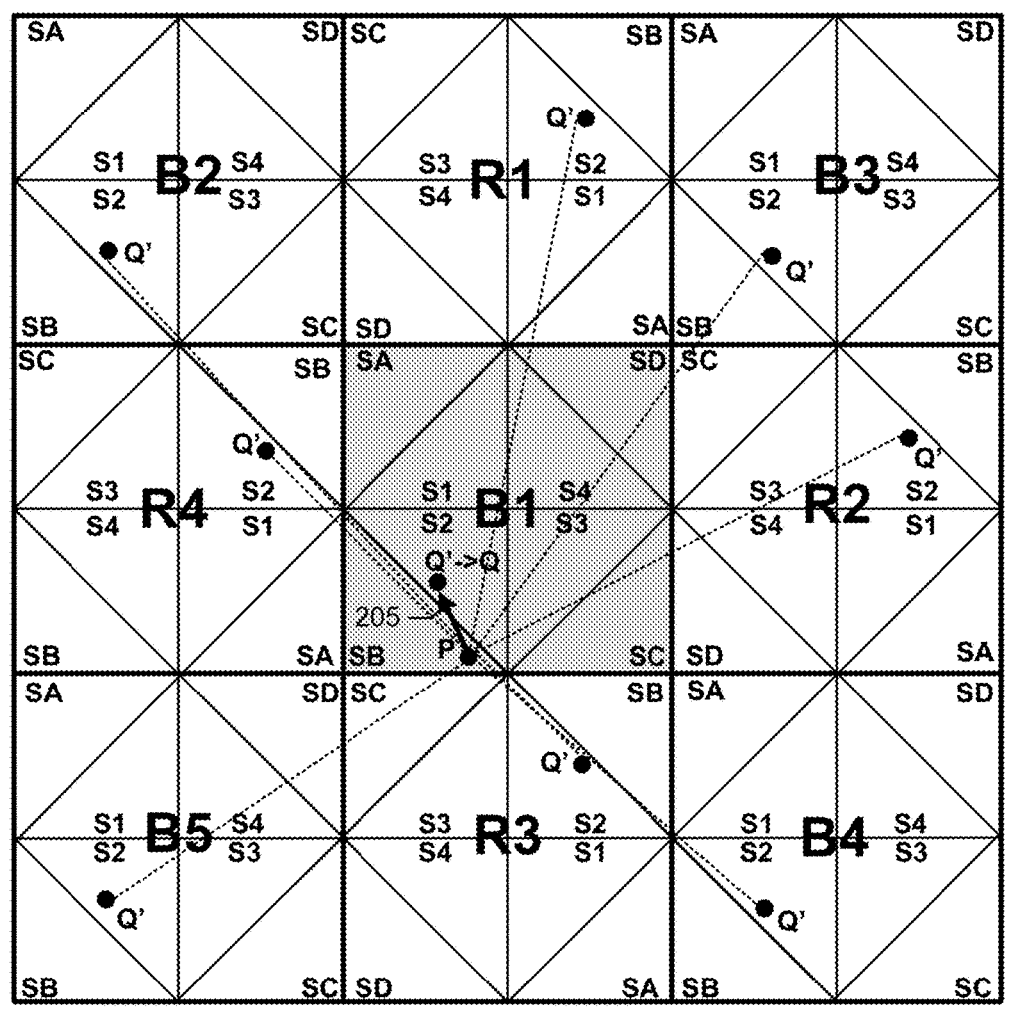
FIG. 2A illustrates an example composite tile, and an example encoding of a normal using the composite tile.

Turning first to FIG. 2A, an example composite tile 200 having tiles B1-B5 and tiles R1-R4 is shown. The tiles B1-B5 will be referred to herein as base tiles. The tiles B2-B5 are instances of the tile B1. The base tiles B1-B5 have inner triangular regions S1, S2, S3 and S4 arranged clockwise starting with the inner upper-left; and outer triangular regions SA, SB, SC, SD arranged clockwise starting with the outer upper-left. In examples described herein, the tiles R1-R4 are instances of the base tile rotated by 180 degrees. The tiles R1-R4 will be referred to herein as rotated tiles. Thus, the rotated tiles R1-R4 have inner triangular regions S3, S2, S1 and S4 arranged clockwise starting with the inner upper-left; and outer triangular regions SC, SB, SA, SD arranged clockwise starting with the outer upper-left. As shown, the tiles B1-B5, R1-R4 are tiled in a periodic arrangement. The base tile B1 and the rotated tile R1 are stored in a tile database 130 (see FIG. 1). The other tiles are instances of respective ones of the tile B1, and the tile R1.

In the example composite tile 200, nine tiles are used so that, for instance, a point near the cut tip of the octahedron can retains its short distance to a point on a nearby surface. For example, consider a point in the lower-left corner of base tile B1, it remains close to points in the lower-right corner of rotated tile R4, the upper-right corner of base tile B5, and the upper-left corner of rotated tile R3. The example tiles described herein have 8 triangular regions arranged in a square. If other geometric shapes are used, regions and/or tiles may have different shapes and, thus, the arrangement and number of necessary tiles may change.

Normals may be assumed to be normalized, that is, have length of one. In some implementations, the normal may not be normalized. Assuming normals are of unit length, they can be expressed with two dimensions on the surface of a unit sphere.

Figure 3:
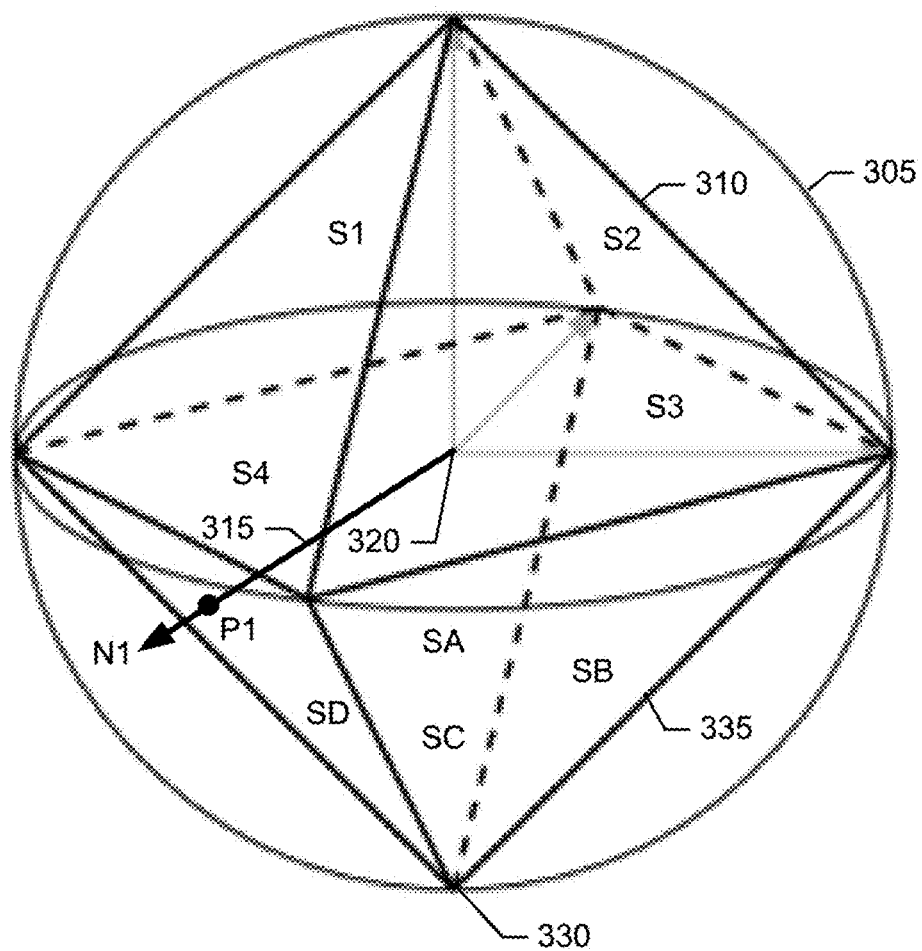
FIG. 3 illustrates an example geometric shape having surfaces used to define the example composite tile of FIGS. 2A-2B.

FIG. 3 illustrates an example of a unit sphere 305. Points on the unit sphere 305 can be expressed with two values. The two values can be determined using a variety of methods, such as, by evaluating trigonometric functions, rational parameterizations of a circle, etc. Another method can include inscribing a geometric shape, e.g., an octahedron 310, into the unit sphere 305. A vector 315 from the center 320 of the sphere 305 defines the direction of a normal N1. The point P1 where the vector 315 intersects a surface of the octahedron 310 represents the normal N1. For each normal, the center 320 of the sphere 305 is logically placed at the origin of the normal N1 and then used to determine the two values representing the intersection of the normal N1 with the octahedron 310. Although not shown, other geometric shapes may be used. In general, an exemplary shape provides for ease of mapping (e.g., low computational complexity) of points on the sphere 305 to points on the shape, and points on the shape to points on a transformed representation of the shape that facilitates tiling and/or transformation (e.g., inversion) as disclosed herein. The octahedron shape disclosed herein is merely one example of a shape having these properties. Any methods, algorithms, logic, circuits, etc. may be used to map a point on the unit sphere 305 to a point on a transformed representation of a shape.

The surface of the octahedron 310 can be parameterized with a unit square with little distortion. The octahedron 310 shown in FIG. 3 has 8 surfaces S1-S4 and SA-SD. The surfaces S1-S4 represent the top half of the octahedron 310, and the surfaces SA-SD represent the bottom half of the octahedron 310.

The surfaces S1-S4, SA-SD of the octahedron 310 can be mathematically rearranged into an at least partially planar surface. Conceptually, the octahedron 310 can be cut open at its lower tip 330 and along its 4 lower edges (one of which is designated at reference numeral 335), which then form the boundaries of the base tile B1. Referring also to FIG. 2A, the base tile B1 represents a planar unit square, where each triangle S1 through S4, and SA through SD of the base tile B1 represents a corresponding surface S1 through S4, and SA through SD of the octahedron 310. In the example of FIGS. 2A and 3, the inner triangles S1-S4 correspond to the upper surfaces S1-S4 of the octahedron 310, and the outer triangles SA-SD correspond to the lower surfaces SA-SD of the octahedron 310. However, that convention could be reversed. For instance, the inner triangles could correspond to the lower surfaces, and the outer triangles could correspond to the upper surfaces. In some implementations, the triangles can be referred to as portions of a tile. In some implementations, the triangles can be referred to as areas or portions of a tile. In some examples, the triangles can be referred to as regions of a tile.

A benefit of the tile arrangement of FIG. 2A is that a first point in, for example, triangle SB in tile B1 may be closer to a second point in triangle SA in tile R4 than to a third point corresponding to the second point in triangle SA in tile B1. Thus, a first vector between the first point in triangle SB in tile B1 and the second point in triangle SA in tile R4 is shorter than a second vector between the first point in triangle SB in tile B1 and the third point in triangle SA in tile B1 due to the arrangement of tile R4 next to tile B1. Accordingly, the second point in triangle SA in tile R4 which is closest to the first point in triangle SB in tile B1 can be selected and used. Use of only the base tile B1 without the other tiles results in the lower triangles SA-SD being penalized when vectors cross between lower triangles SA-SD. Use of the example composite tile 200 of FIG. 2A enables lower triangles SA-SD to be treated equally with upper triangles S1-S4 because lower triangles SA-SD are now adjacent to lower triangles SA-SD in adjacent tiles.

In some examples, a predicted point P, and a difference vector between the predicted point P and an actual point Q where the normal intersects the octahedron 310 are used to represent a normal. In some examples, the points P and Q are received by the engine 100 via the communication interface 110. In some examples, a predictor 120 determines the point P. The point P may be determined using any number and/or type(s) of algorithms, methods, circuits, processors, etc. For example, the most recent point Q could be used as the point P for the next normal vector, using past points Q to predict the point P for the next normal vector (e.g., for smoothly varying surfaces), the decoded geometric normal of a surface, an average normal of adjacent surfaces, etc. The points P are known to both an encoder and a decoder receiving encoded data from the encoder.

Referring to FIG. 2A, the point mapper 117 maps a predicted point P into triangle SB in the base tile B1, and an actual point Q into triangle S2 of each of the tiles B1-B5, R1-R4 as points Q'. The points Q' correspond with the actual point Q, but are in tiles having different orientations. Points in different tiles are said to correspond if they are located at the same locations in their respective tile. For example, in FIG. 2A, the points Q' are all in the triangles S2 about halfway along the shared line with triangle SB, and all represent the same normal.

The coordinates of the points P, P', Q, and Q' may be quantized (e.g., represented using fixed point numbers), or may be un-quantized (e.g., represented using floating point numbers). In some examples, the coordinates of the points P and Q are received as fixed point numbers. In some examples, the coordinates of the points P and Q are received as floating point numbers and quantized during determining of normal vectors.

The distance determiner 118 determines the distances from the predicted point P to each of the points Q'. The distance determiner 118 identifies the point Q' having the shortest distance to the predicted point P. In the example of FIG. 2A, the point Q' closest to the predicted point P is the point Q' in triangle S2 of the base tile B1. Accordingly, the point Q' in triangle S2 of the base tile B1 is selected to be the point Q to be used to determine a difference vector 205. In some examples, outer portions of the tiles B2-B5, R1-R4 are not considered.

Figure 2B:
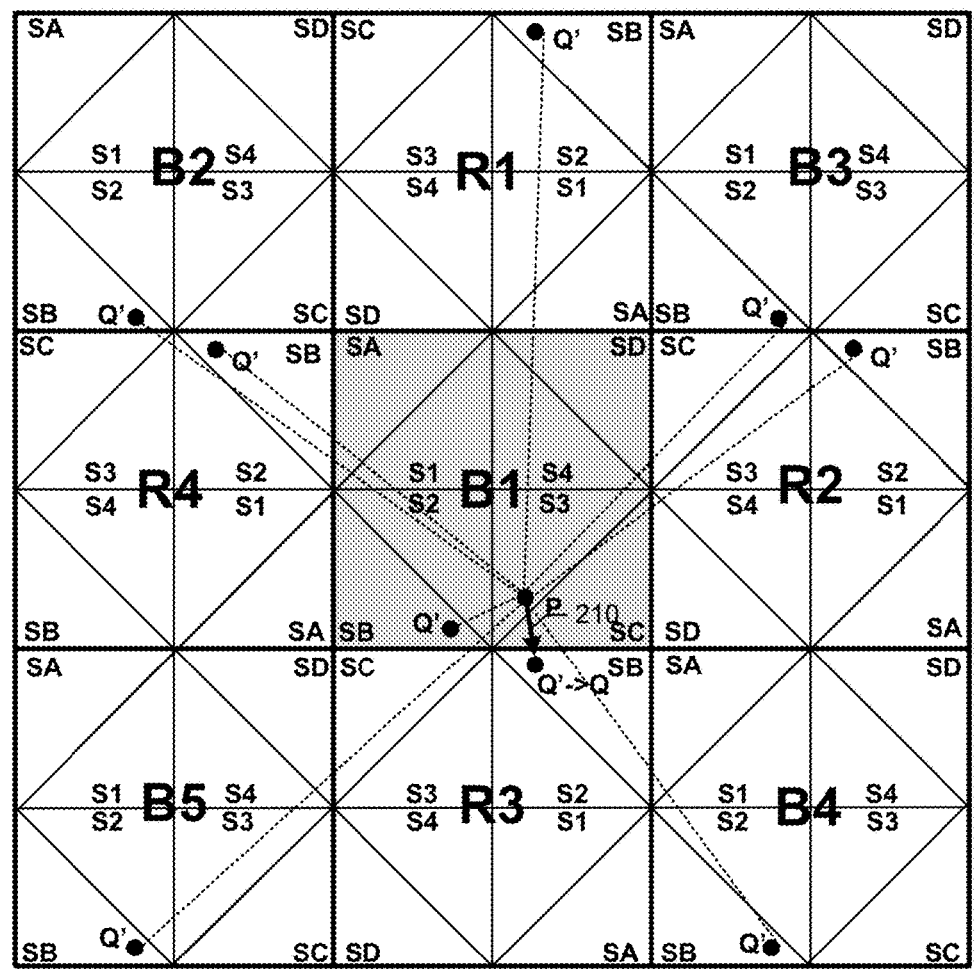
FIG. 2B illustrates another example encoding of a normal using the composite tile of FIG. 2A.

The vectorizer 119 determines the difference vector 205 between the point P and the selected point Q. The vectorizer 119 determines two parameters (e.g., X and Y) that express the difference vector 205. Like, the P, P', Q and Q' points, the parameters (e.g., X and Y) representing the difference vector 205 may be quantized numbers, or un-quantized numbers. In practice, the parameters X and Y represent an approximation of the difference vector 205. The approximation can be more or less accurate depending on the mathematical precision used to represent P, Q, X and Y. In some instances, the parameters X and Y may accurately represent the difference vector 205. The vectorizer 119 stores the parameters in the buffer 115. At intervals, the outgoing contents of the buffer 115 are entropy coded (e.g., compressed) by the coder 116A to reduce the number of bits required to represent the difference vector parameters stored in the buffer 115. The entropy encoder 116A can provide more compression when the buffer 115 stores values that repeat more often, e.g., with high frequency. Which is why it is advantageous to aim for shorter difference vectors, as this causes a higher probability for small coordinate values to repeat. In another example shown in FIG. 2B, the point mapper 117 maps a predicted point P into the triangle S3 of the base tile B1, and the actual point Q into the triangles SB of the tiles B1-B5 and R1-R4 as point Q'. The distance determiner 118 determines the distances from the predicted point P to each of the points Q', and identifies the point Q' having the shortest distance to the predicted point P. In the example of FIG. 2B, the point Q' closest to the predicted point P is included in rotated tile R3. The point Q' is selected as the point Q to be used to determine a difference vector 210. The vectorizer 119 determines the difference vector 205 between the point P and the selected point Q. The vectorizer 119 determines two parameters (e.g., X and Y) that express the difference vector 205. The vectorizer 119 stores the parameters in the buffer 115. At intervals, the outgoing contents of the buffer 115 are entropy coded (e.g., compressed) by the coder 116A to reduce the number of bits to represent the difference vector parameters stored in the buffer 115.

Figure 4:
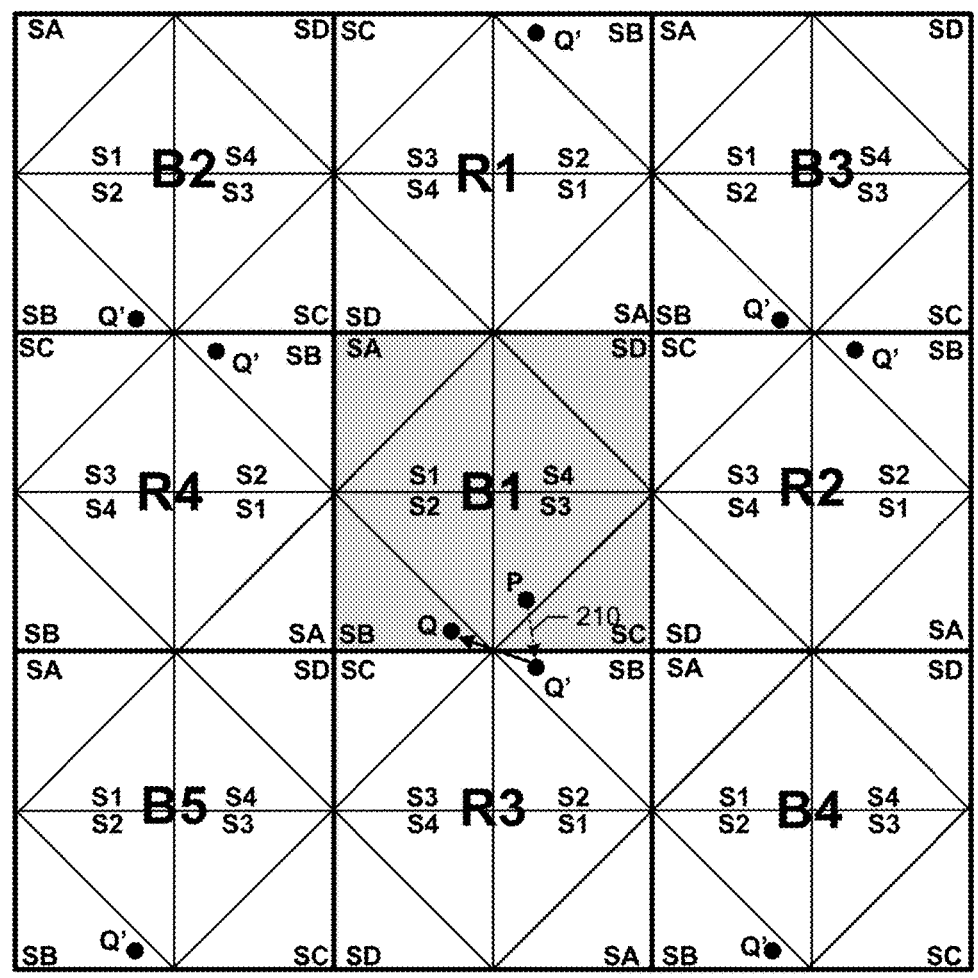
FIG. 4 illustrates an example decoding of an encoded normal using the example composite tile of FIGS. 2A-2B.

Turning to FIG. 4, an example decoding of the example normal of FIG. 2B is shown. Predicted point P values and encoded difference vectors are stored in the buffer 115. At intervals, encoded difference vectors in the buffer 115 are entropy decoded (e.g., decompressed) by the decoder 116B to obtain difference vectors. For a point P and a decoded difference vector (e.g., the point P and difference vector 210 of FIG. 2B), the point mapper 117 maps the predicted point P to triangle S3 of the base tile B1. The vectorizer 119 uses the difference vector 210 and the predicted point P to determine a point Q'. If the point Q' is disposed in the base tile B1, the point Q' is taken as the decoded actual point Q. If the point Q' is disposed outside the base tile B1, as shown in FIG. 4, the point Q in triangle SB of the base tile B1 corresponding to the point Q' is selected as the decoded point Q. The decoded point Q may be output and/or stored in the buffer 115. In practice, the decoded point Q represents an approximation of the original point Q of an encoded normal vector. The approximation can be more or less accurate depending on the mathematical precision used to represent the difference vector 210 and the point P. In some instances, the point Q can be accurately recovered.

Figure 12:
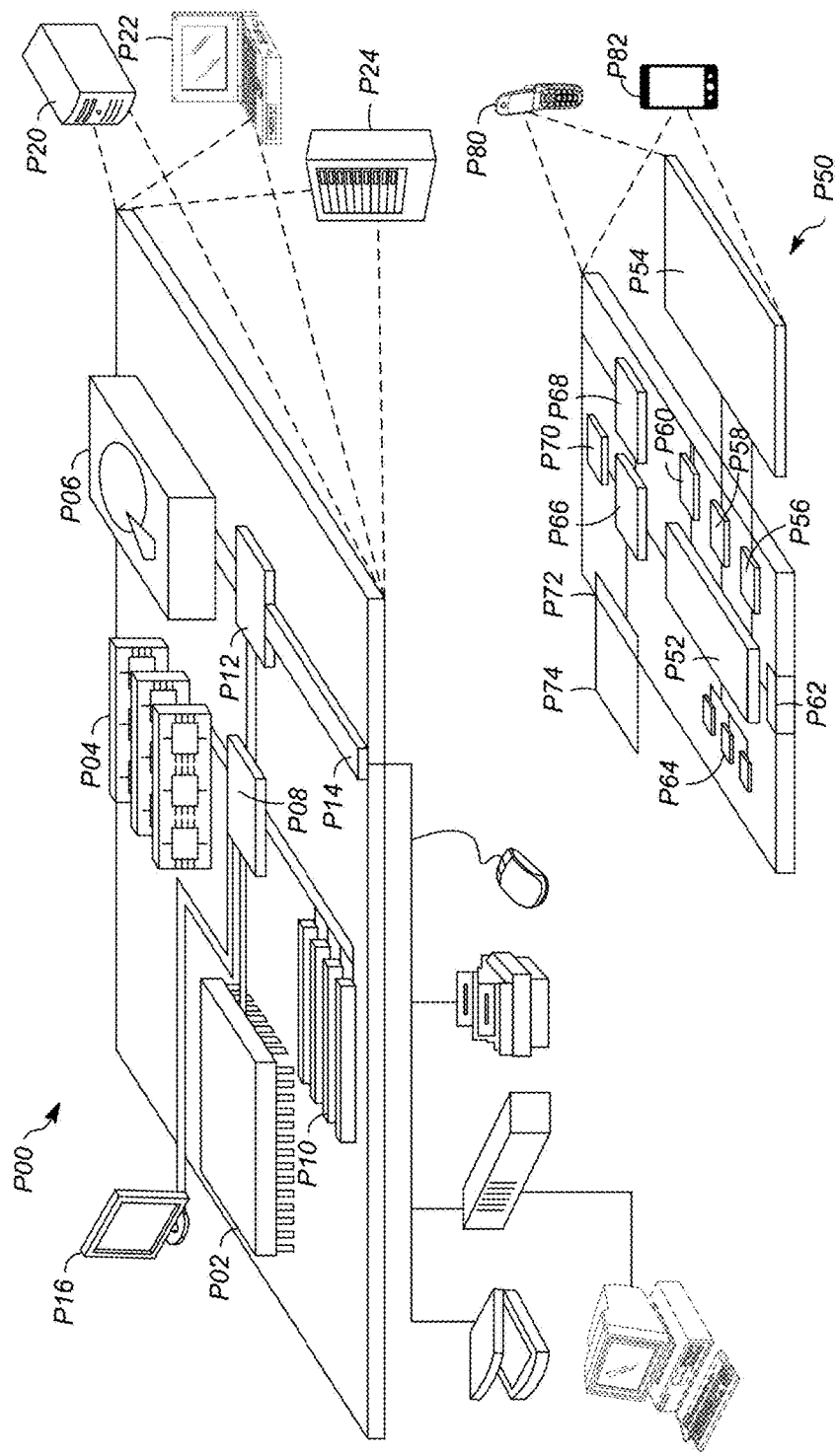
FIG. 12 is a block diagram of an example computer device and an example mobile computer device, which may be used to implement the examples disclosed herein.

FIG. 5 is a flowchart of an example method that may performed to encode normals using the example composite tile 200 of FIG. 2A. The example method may be implemented by the example engine 100 of FIG. 1 and/or as machine-readable instructions performed by one or more processors, such as the example processors 105 (FIG. 1), and P00 and P50 (FIG. 12).

The example method of FIG. 5 includes obtaining a predicted point P and an actual point Q for a normal via, for example, the communication interface 110 (block 505). The point mapper 117 maps the predicted point P to the base tile B1, and the actual point Q to a point Q' in each of the tiles B1-B5 and R1-R4 (block 510). The distance determiner 118 computes distances between point P and each of the points Q' (block 515). The distance determiner 118 selects the point Q' having the shortest distance as point Q (520). The vectorizer 119 determines the difference vector between the point P and the selected point Q (block 525). The difference vector is placed in the buffer 115 for subsequent coding (e.g., compression) (block 530). When all normals have been processed (block 535), contents of the buffer are entropy encoded by the coder 116A (block 540), and control exits from the example method of FIG. 5.

FIG. 6 is a flowchart of an example method that may be performed to decode normals using the example composite tile 200 of FIG. 2A. The example method may be implemented as machine-readable instructions performed by one or more processors, such as the example processors 105 (FIG. 1), and P00 and P50 (FIG. 12).

The example method of FIG. 6 includes the decoder 116B decoding a buffer 115 of difference vectors (block 605). A difference vector and predicted point P are extracted from the buffer (block 610). The vectorizer 119 uses the point P and the difference vector to determine a point Q' (block 615). If the point mapper 117 determines the point Q' is disposed in the base tile B1 (block 620), the point Q' is selected as the decoded point Q (block 625). If the point mapper 117 determines the point Q' is disposed outside the base tile B1 (block 620), the point Q' is mapped to a corresponding point Q in the base tile B1 (block 630). The point Q is output via the communication interface 110 (block 635). When all normals have been processed (block 640), control exits from the example method of FIG. 6.

Figure 7A:
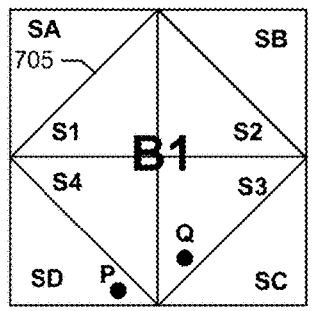
FIGS. 7A and 7B illustrate an example tile assembly, and an example encoding of a normal using the tile assembly of FIGS. 7A and 7B.
Figure 7B:
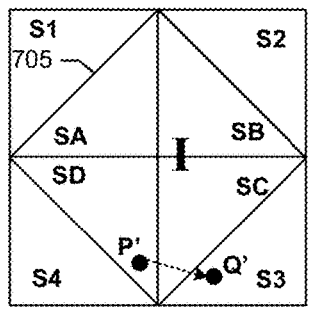
Figure 7C:
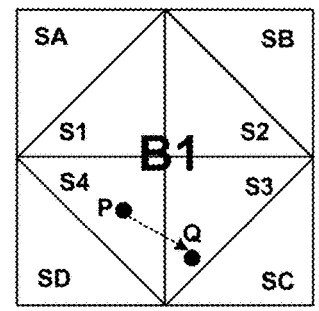
FIG. 7C illustrates another example encoding of a normal using the example tile assembly of FIGS. 7A and 7B.

FIGS. 7A-7C illustrate another example method of encoding normals. Recognizing that it is points that are disposed on the cut half of the octahedron that are penalized, FIGS. 7A-7C show an example tile assembly having two tiles, each being an inverted version of each other. Briefly, when a point is disposed on the uncut half of the octahedron, a first tile is used, the point is disposed on an inner triangle of the first tile. When a point is disposed on the cut half of the octahedron, a second tile which is inverted from the first tile, is used. Accordingly, this latter point is located on an inner triangle of the second tile, and will not be penalized for falling on the cut half of the octahedron. Which tile is used to encode a point, depends on where the point falls on the octahedron. The encoded normal of FIGS. 7B and 7C can be decoded using the same normal tile, inverted tile pair. Only a pair of tiles is needed in this example, because there are only two halves of the octahedron that are considered. For other geometric shapes, the number of tiles and/or their constituents may change.

The example of FIGS. 7A-7C uses a group of tiles, for example, a pair of tiles B1 and I. The tile B1 is identical to the base tile B1 of FIG. 2A. The tile I is an inverted version of the tile B1. The inverted tile I is formed by mirroring corresponding inside and outside triangles (e.g., triangle S1 and triangle SA) along their shared diagonal 705. That is, in the tile B1, the surfaces S1 through S4 of the uncut half of the octahedron are used to form the inner triangular regions of the square, and the surfaces SA through SD of the cut half of the octahedron are used to form the outer triangular regions. In FIG. 7B, an opposite end of the octahedron is cut. In the tile I1, the surfaces S1 through S4 of the cut half of the octahedron are used to form the outer triangular regions of the square, and surfaces SA through SD of the uncut half of the octahedron are used to form the inner triangular regions. The tile B1 and the tile I may be stored in the tile database 130.

Using a predicted point P and an actual point Q, the point mapper 114 determines whether the predicted point P is disposed in one of the outer triangles SA-SD of the tile B1. If, as shown in FIG. 7A, the point P is disposed in an outer triangle SD of the inverted tile B1, the point mapper 114 maps the point P to a corresponding point P' in the inverted tile I, and the point Q to corresponding point Q' in the inverted tile I, as shown in FIG. 7B. The vectorizer 119 determines the difference vector between the point P' and the point Q', and stores the difference vector in the buffer 115. FIG. 7C shows another example in which the point P is disposed in an inner triangle S4 of the base tile B1 and, thus, the vectorizer 119 determines the difference vector between the point P and the point Q within the base tile B1. As discussed above, the points P and Q may be quantized, and/or the difference vector may be an approximation. The point P may be determined by the predictor 120.

Figure 8A:
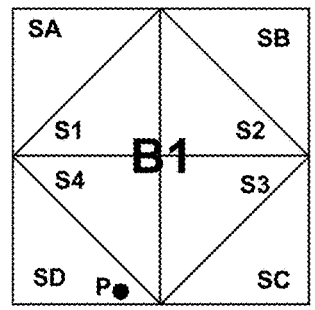
FIGS. 8A and 8B illustrate an example decoding of an encoded normal using the example tile assembly of FIGS. 7A and 7B.
Figure 8B:
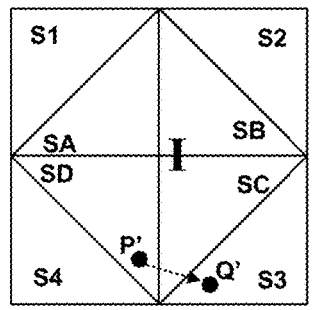
Figure 8C:
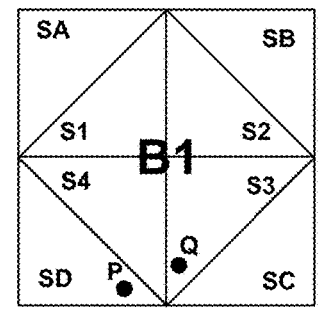
FIG. 8C illustrates another example decoding of an encoded normal using the example tile assembly of FIGS. 7A and 7B.

FIGS. 8A-8C illustrate an example decoding for the example encoding of FIGS. 7A and 7B. Like the example of FIGS. 7A-7C, the example decoding of FIGS. 8A-8C chooses a starting tile such that the prediction point P is disposed in an inner triangle of the starting tile. Decoding proceeds from the starting tile.

As shown in FIG. 8A, the predicted point P is disposed in an outer triangle SD of the base tile B1. Accordingly, as shown in FIG. 8B, the point mapper 114 maps the point P to a corresponding point P' in the inverted tile I. The vectorizer 119 uses a difference vector to determine an actual point Q', as shown in FIG. 8B. Because the predicted point P is disposed in an outer triangle SD of the base tile T1, the point Q' is mapped to its corresponding point Q in the base tile B1, as shown in FIG. 8C. As discussed above, the decoded point Q may be an approximation of the original point Q.

Figure 9:
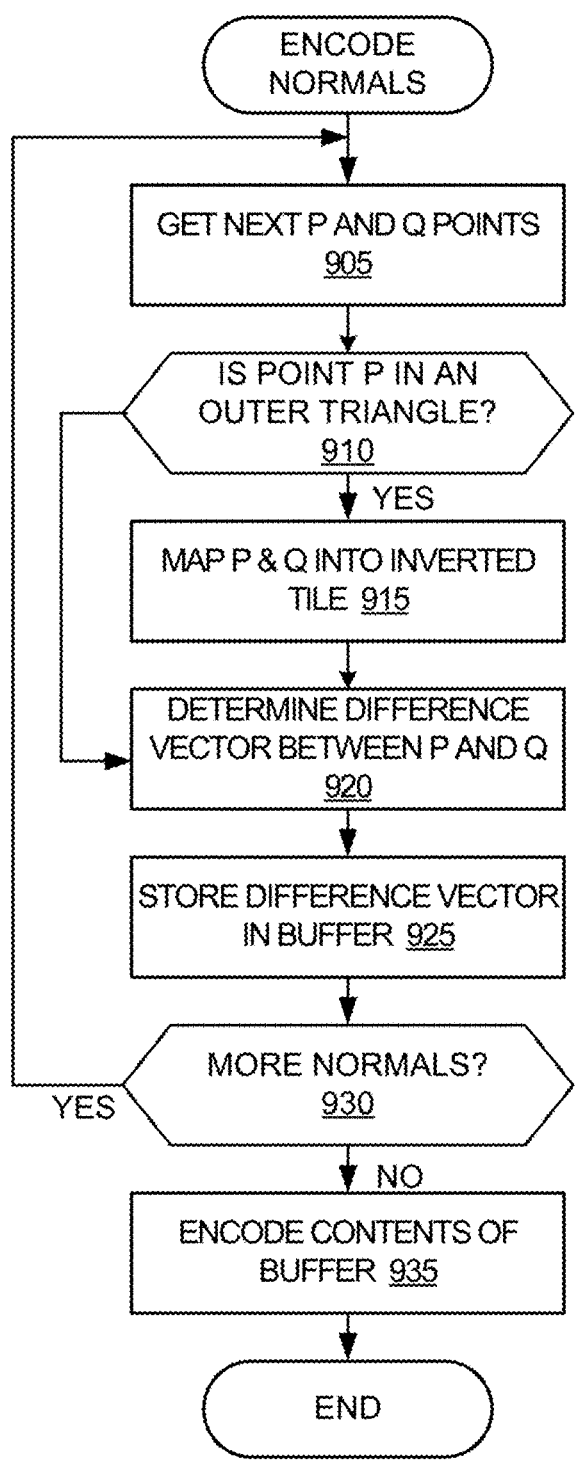
FIG. 9 is a flowchart representing an example method that may be used to encode a normal using the example tile assembly of FIGS. 7A-7B.

FIG. 9 is a flowchart of another example method that may be performed to to encode normals using the example tile B1 (see FIG. 7A) and the inverted tile I (see FIG. 7B). The example method may, for example, be implemented as machine-readable instructions performed by one or more processors, such as the example processors 105 (FIG. 1), and P00 and P50 (FIG. 12).

The example method of FIG. 9 includes obtaining a predicted point P and an actual point Q via the communication interface 110 (block 905). If the point mapper 117 determines the point P is in an outer triangle of the base tile B1 (block 910), the point mapper 117 maps the point P to a corresponding point P' in the inverted tile I and maps the point Q to a corresponding point Q' in the inverted tile I (block 915). The vectorizer 119 determines a difference vector between the point P' and the point Q' (block 920).

Returning to block 910, if the point mapper 117 determines the point P is in an inner triangle of the base tile B1 (block 910), the vectorizer 119 determines a difference vector between the point P and the point Q (block 920). The difference vector is stored in the buffer 115. When all normals have been processed (block 930), the coder 116 entropy encodes the contents of the buffer (block 935), and control exits from the example process of FIG. 9.

Figure 10:
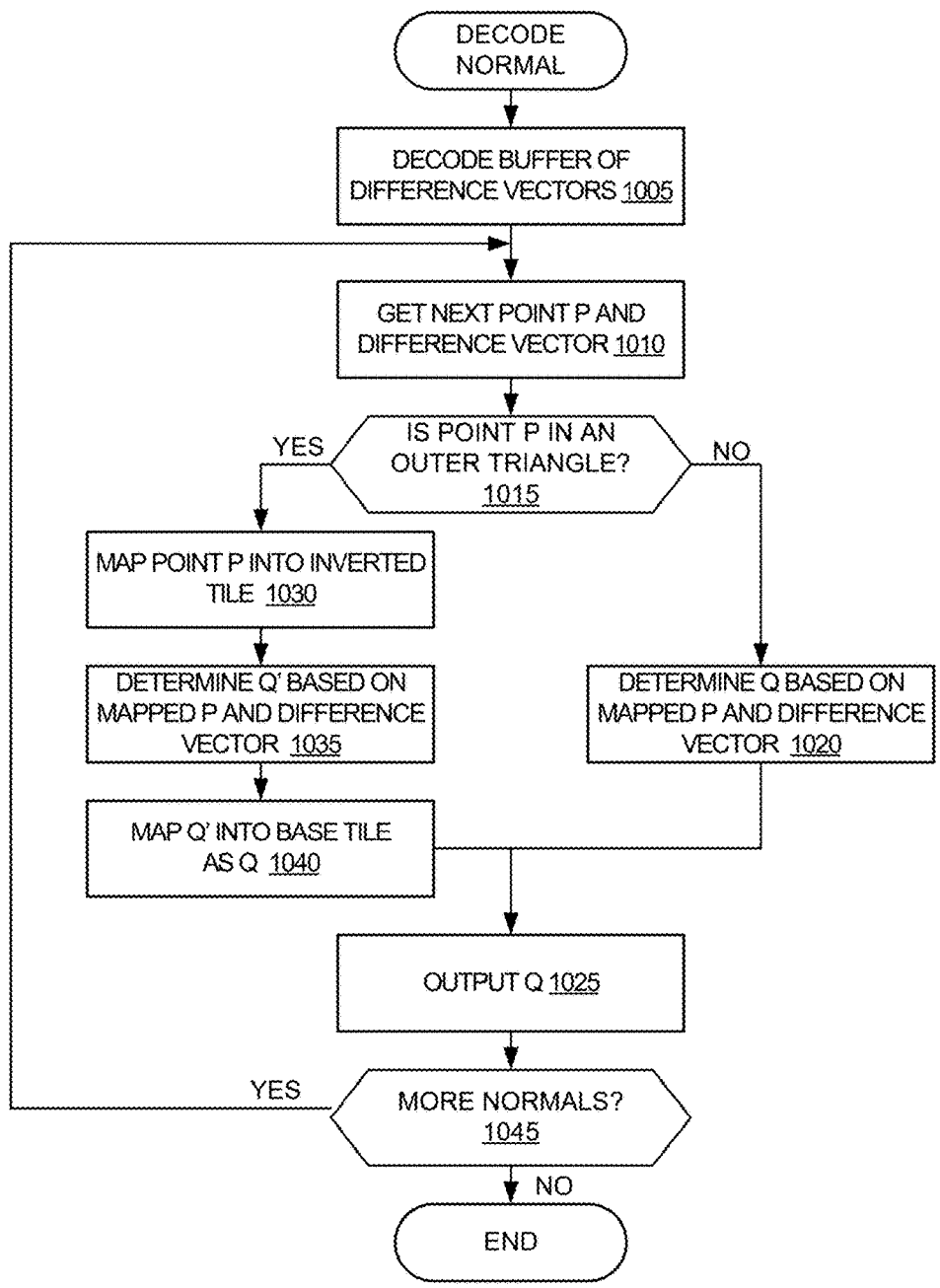
FIG. 10 is a flowchart representing an example method that may be used to decode an encoded normal using the example tile assembly of FIGS. 7A-7B.

FIG. 10 is a flowchart of another example method that may be performed, to decode normals using the example base tile B1 (see FIG. 7A) and the inverted tile I (see FIG. 7B). The example method may, for example, be implemented as machine-readable instructions performed by one or more processors, such as the example processors 105 (FIG. 1), and P00 and P50 (FIG. 12).

The example method of FIG. 10 includes the decoder 116B decoding a buffer 115 of encoded difference vectors (block 1005). For a predicted point P and a difference vector (block 1010), if the point mapper 117 determines the point P is in an inner triangle of the base tile B1 (block 1015), the vectorizer 119 determines the point Q is based on the point P and difference vector (block 1020), and the point Q is output via the communication interface 110 (block 1025).

Returning to block 1015, if the point mapper 117 determines the point P is in an outer triangle of the base tile B1 (block 1015), the point mapper 117 maps the point P to a corresponding point P' in the inverted tile I (block 1030). The vectorizer 119 determines the point Q' based on the point P' and the difference vector (block 1035), and the point Q is output via the communication interface 110 (block 1025).

When all normals have been processed (block 1045), control exits from the example process of FIG. 10.

FIG. 11 is a table showing example compression gains that may be obtained using the example methods disclosed herein. The table of FIG. 11 compares four compression methods: naïve correction encoding, the composite tile method of FIGS. 2A, 2B, 4, 5 and 6, and the base tile+inverted tile assembly method of FIGS. 7A-C, 8A-C, 9 and 10. The table shows compression performance for the four methods for three models: the Stanford bunny, a Buddha, and an extra large (XL) model of Boston. In this comparison, the actual point Q for a normal is used as the predicted point P for the next normal. The table shows the number of bytes occupied by the normals. The table also shows the reduction in percentage (%) in the number of bytes yielded by each of the methods, for each of the three images. As shown, the methods disclosed herein provide meaningful improvements in compression of approximately 4% to 5% depending on the surface characteristics. For example, the Bunny and Buddha images have more surface direction variations, and the Boston XL image has more normals in the same direction.

In a general aspect, a method includes defining a tile having a plurality of regions, each of the plurality of regions of the tile corresponding with a surface from a plurality of surfaces of a geometric shape, arranging an edge of a first instance of the tile to abut an edge of a second instance of the tile to define a composite tile, determining a first vector between a first point on the composite tile in the first instance of the tile, and a second point on the composite tile in the second instance of the tile, and encoding the first vector to determine an approximation of the location of the second point relative to the first point.

Implementations can include one or more of the following, alone or in any combinations with each order. For example, the first point represents a predicted normal for a geometric representation of a surface, and the second point represents an actual normal for the geometric representation of the surface;

determining a second vector between the first point in the first instance of the tile, and a third point on the composite tile in the first instance of the tile; and when the second vector is shorter than the first vector, encoding the second vector rather than the first vector rather than the first vector to determine the approximation of the location of the second point relative to the first point;

encoding the vector includes determining a plurality of vectors between respective pairs of points in the composite tile, and encoding contents of a buffer containing the first vector and the plurality of vectors;

encoding the contents of the buffer includes entropy encoding the contents of the buffer;

the second instance of the tile is rotated relative to the first instance of the tile in the composite tile;

the composite tile comprises a tiled arrangement of a plurality of first instances of the tile and a plurality of second instances of the tile;

determine a composite point on the composite tile in the first tile, the composite point corresponding to the second point, determine a first distance between the first point and the second point, determine a second distance between the first point and the composite point and determining the vector between the first point and the composite point when the second distance is less than the first distance.

In another general aspect, a method includes defining a tile having a plurality of regions, each of the plurality of regions of the tile corresponding with a surface from a plurality of surfaces of a geometric shape; arranging an edge of the first tile to abut an edge of the second tile to define a composite tile decoding a vector to determine a decoded vector, using a first point and the decoded vector to determine a second point, when the second point is disposed on the second instance of the tile, mapping the second point to a corresponding third point on the first instance of the tile, and outputting the third point.

Implementations can include one or more of the following, alone or in any combinations with each order. For example, receiving a plurality of vectors between respective pairs of points in the composite tile, and decoding contents of a buffer containing the vector and the plurality of vectors to determine the decoded vector;

the second instance of the tile is rotated relative to the first instance of the tile;

the composite tile comprises a tiled arrangement of a plurality of first instances of the tile and a plurality of second instances of the tile.

In yet another general aspect, a method includes defining a first tile having a plurality of regions, each of the plurality of regions of the first tile corresponding with a surface from a plurality of surfaces of a geometric shape, the plurality of regions in a first arrangement in the first tile, defining a second tile having a plurality of regions, each of the plurality of regions of the second tile corresponding with a surface from the plurality of surfaces of the geometric shape, the plurality of regions in a second different arrangement in the second tile, when a first point on the first tile is outside a region of the first tile, mapping the first point to a corresponding second point on the second tile, and mapping a third point on the second tile, determining a vector between the second point and the third point; and encoding the vector to determine an approximation of the location of the third point relative to the first point.

Implementations can include one or more of the following, alone or in any combinations with each order. For example, encoding the vector includes determining a plurality of vectors between respective pairs of points, and encoding contents of a buffer containing the vector and the plurality of vectors;

encoding the contents of the buffer comprises entropy encoding the contents of the buffer;

defining the second tile comprises swapping an outer portion of the first tile with an inner portion of the first tile.

In still a further general aspect, a method includes defining a first tile having a plurality of regions, each of the plurality of regions of the first tile corresponding with a surface from a plurality of surfaces of a geometric shape, the plurality of regions in a first arrangement in the first tile, defining a second tile having a plurality of regions, each of the plurality of regions of the second tile corresponding with a surface from the plurality of surfaces of the geometric shape, the plurality of regions in a second different arrangement in the second tile, decoding a vector to determine a decoded vector, using a first point and the decoded vector to determine a second point, when the first point is disposed in an outer portion of the first tile, mapping the second point into a corresponding fourth point on the first tile, and outputting the fourth point.

Implementations can include one or more of the following, alone or in any combinations with each order. For example:

receiving a plurality of vectors between respective pairs of points, and decoding contents of a buffer containing the vector and the plurality of vectors;

defining the second tile comprises swapping an outer portion of the first tile with an inner portion of the first tile.

One or more of the elements and interfaces disclosed herein may be duplicated, implemented in the parallel, implemented in the singular, combined, divided, re-arranged, omitted, eliminated and/or implemented in any other way. Further, any of the disclosed elements and interfaces may be implemented by a processor, a computer and/or a machine having a processor, such as the example processor platforms P00 and P50 discussed below in connection with FIG. 12. Example processors include, but are not limited to a circuit, a programmable processor, fuses, an application-specific integrated circuit (ASIC), a programmable logic device (PLD), a field-programmable logic device (FPLD), a field-programmable gate array (FPGA), a digital signal processor (DSP), a graphics processing unit (GPU), a central processing unit (CPU), a microcontroller, a controller, etc. Any of the elements and interfaces disclosed herein may, for example, be implemented as instruction, program code, machine-readable instructions, etc. performed by one or more of a processor, a computer and/or a machine having a processor. A processor, a computer and/or a machine having a processor may be used, configured and/or programmed to execute and/or carry out the examples disclosed herein. For example, any of the examples may be embodied in instructions, program code, machine-readable instructions, etc. stored on a tangible and/or non-transitory computer-readable medium accessible by a processor, a computer and/or other machine having a processor, such as the example processor platforms P00 and P50 discussed below in connection with FIG. 12. Machine-readable instructions include, for example, instructions that cause a processor, a computer and/or a machine having a processor to perform one or more particular processes or methods. When a claim of this patent incorporating one or more of the elements of FIG. 1 is read to cover a purely software and/or firmware implementation, at least one of the elements of FIG. 1 is hereby expressly defined to include a tangible article of manufacture such as a tangible machine-readable medium storing machine-readable instructions such as the firmware and/or software.

The example methods disclosed herein may, for example, be implemented as instructions, program code, machine-readable instructions performed by a processor, a computer and/or other machine having a processor. A processor, a controller and/or any other suitable processing device such as those shown in FIG. 12 may be used, configured and/or programmed to execute and/or carry out the example methods. For example, they may be embodied in instructions, program code and/or machine-readable instructions stored on a tangible and/or non-transitory computer-readable medium accessible by a processor, a computer and/or other machine having a processor, such as those discussed below in connection with FIG. 12. Many other methods of implementing the example methods may be employed. For example, the order of execution may be changed, and/or one or more of the blocks and/or interactions described may be changed, eliminated, sub-divided, or combined. Additionally, any or the entire example methods may be performed sequentially and/or performed in parallel by, for example, separate processing threads, processors, devices, discrete logic, circuits, etc.

As used herein, the terms "computer-readable medium" and "machine-readable medium" expressly exclude propagating signals. Example computer-readable or machine-readable medium include, but are not limited to, one or any combination of a volatile and/or non-volatile memory, a volatile and/or non-volatile memory device, a compact disc (CD), a digital versatile disc (DVD), a read-only memory (ROM), a random-access memory (RAM), a FLASH drive, a floppy disk, a Synchronous Dynamic Random Access Memory (SDRAM), a Dynamic Random Access Memory (DRAM), a RAMBUS Dynamic Random Access Memory (RDRAM) a programmable ROM (PROM), an electronically-programmable ROM (EPROM), an electronically-erasable PROM (EEPROM), a solid state (SS) memory, a solid state disk (SSD), an optical storage disk, an optical storage device, a magnetic storage disk, a network-attached storage (NAS) device, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

FIG. 12 shows an example of a generic computer device P00 and a generic mobile computer device P50, which may be used with the techniques described here. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, and may be mounted on a common motherboard or in other manners as appropriate. The processor P02 can process instructions for execution within the computing device P00, including instructions stored in the memory P04 or on the storage device P06 to display graphical information for a GUI on an external input/output device, such as display P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, display P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a display P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and display interface P56 coupled to a display P54. The display P54 may be, for example, a TFT LCD (Thin-Film-Transistor Liquid Crystal Display) or an OLED (Organic Light Emitting Diode) display, or other appropriate display technology. The display interface P56 may comprise appropriate circuitry for driving the display P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single In Line Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory P64, expansion memory P74, or memory on processor P52 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A method comprising:
defining a tile having a plurality of regions, each of the plurality of regions of the tile corresponding with a surface from a plurality of surfaces of a geometric shape;
arranging an edge of a first instance of the tile to abut an edge of a second instance of the tile to define a composite tile;
determining a first vector between a first point on the composite tile in the first instance of the tile and a second point on the composite tile in the second instance of the tile;
determining a second vector between the first point in the first instance of the tile and a third point on the composite tile in the first instance of the tile; and
encoding, when the second vector is shorter than the first vector the second vector to determine an approximation of a location of the second point relative to the first point.

2. The method of claim 1, wherein the first point represents a predicted normal for a geometric representation of a surface, and the second point represents an actual normal for the geometric representation of the surface.

3. The method of claim 1, further comprising:
when the first vector is shorter than the second vector, encoding the first vector to determine the approximation of the location of the second point relative to the first point.

4. The method of claim 1, wherein encoding the vector comprises:
determining a plurality of vectors between respective pairs of points in the composite tile; and
encoding contents of a buffer containing the second vector and the plurality of vectors.

5. The method of claim 4, wherein encoding the contents of the buffer comprises entropy encoding the contents of the buffer.

6. The method of claim 1, wherein the second instance of the tile is rotated relative to the first instance of the tile in the composite tile.

7. The method of claim 1, wherein the composite tile includes a tiled arrangement of a plurality of first instances of the tile and a plurality of second instances of the tile.

8. The method of claim 1, further comprising:
determining a composite point on the composite tile in the first instance of the tile, the composite point corresponding to the second point;
determining a first distance between the first point and the second point;
determining a second distance between the first point and the composite point; and
determining a vector between the first point and the composite point when the second distance is less than the first distance.

9. A non-transitory computer-readable storage medium having stored thereon computer executable program code which, when executed on a computer system, causes the computer system to perform operations, comprising:
defining a tile having a plurality of regions, each of the plurality of regions of the tile corresponding with a surface from a plurality of surfaces of a geometric shape;
arranging an edge of a first instance of the tile to abut an edge of a second instance of the tile to define a composite tile;
determining a first vector between a first point on the composite tile in the first instance of the tile and a second point on the composite tile in the second instance of the tile;
determining a second vector between the first point in the first instance of the tile and a third point on the composite tile in the first instance of the tile; and
encoding, when the second vector is shorter than the first vector, the second vector to determine an approximation of a location of the second point relative to the first point.

10. The computer-readable storage medium of claim 9, wherein the first point represents a predicted normal for a geometric representation of a surface, and the second point represents an actual normal for the geometric representation of the surface.

11. The computer-readable storage medium of claim 9, further comprising:
when the first vector is shorter than the second vector, encoding the first vector to determine the approximation of the location of the second point relative to the first point.

12. The computer-readable storage medium of claim 9, wherein encoding the vector comprises:
determining a plurality of vectors between respective pairs of points in the composite tile; and
encoding contents of a buffer containing the second vector and the plurality of vectors.

13. The computer-readable storage medium of claim 12, wherein encoding the contents of the buffer comprises entropy encoding the contents of the buffer.

14. The computer-readable storage medium of claim 9, wherein the second instance of the tile is rotated relative to the first instance of the tile in the composite tile.

15. The computer-readable storage medium of claim 9, wherein the composite tile includes a tiled arrangement of a plurality of first instances of the tile and a plurality of second instances of the tile.

16. The computer-readable storage medium of claim 9, further comprising:
determining a composite point on the composite tile in the first instance of the tile, the composite point corresponding to the second point;
determining a first distance between the first point and the second point;
determining a second distance between the first point and the composite point; and
determining a vector between the first point and the composite point when the second distance is less than the first distance.

17. An apparatus comprising:
a processor; and
a memory, the memory including instructions configured to cause the processor to:
define a tile having a plurality of regions, each of the plurality of regions of the tile corresponding with a surface from a plurality of surfaces of a geometric shape;
arrange an edge of a first instance of the tile to abut an edge of a second instance of the tile to define a composite tile;
determine a first vector between a first point on the composite tile in the first instance of the tile and a second point on the composite tile in the second instance of the tile;
determine a second vector between the first point in the first instance of the tile and a third point on the composite tile in the first instance of the tile; and
encode, when the second vector is shorter than the first vector, the second vector to determine an approximation of a location of the second point relative to the first point.

18. The apparatus of claim 17, wherein the first point represents a predicted normal for a geometric representation of a surface, and the second point represents an actual normal for the geometric representation of the surface.

19. The apparatus of claim 17, wherein the second instance of the tile is rotated relative to the first instance of the tile in the composite tile.

* * * * *